3,276,276
WABBLER MECHANISM
Marcel Dangauthier, Paris, France, assignor to Societe d'Etudes et d'Applications Industrielles Commerciales et Immobilieres "Inter-Technique," Paris, France, a corporation of France
Filed Dec. 23, 1963, Ser. No. 332,632
Claims priority, application France, Jan. 30, 1963, 923,141, Patent 1,354,973
5 Claims. (Cl. 74—60)

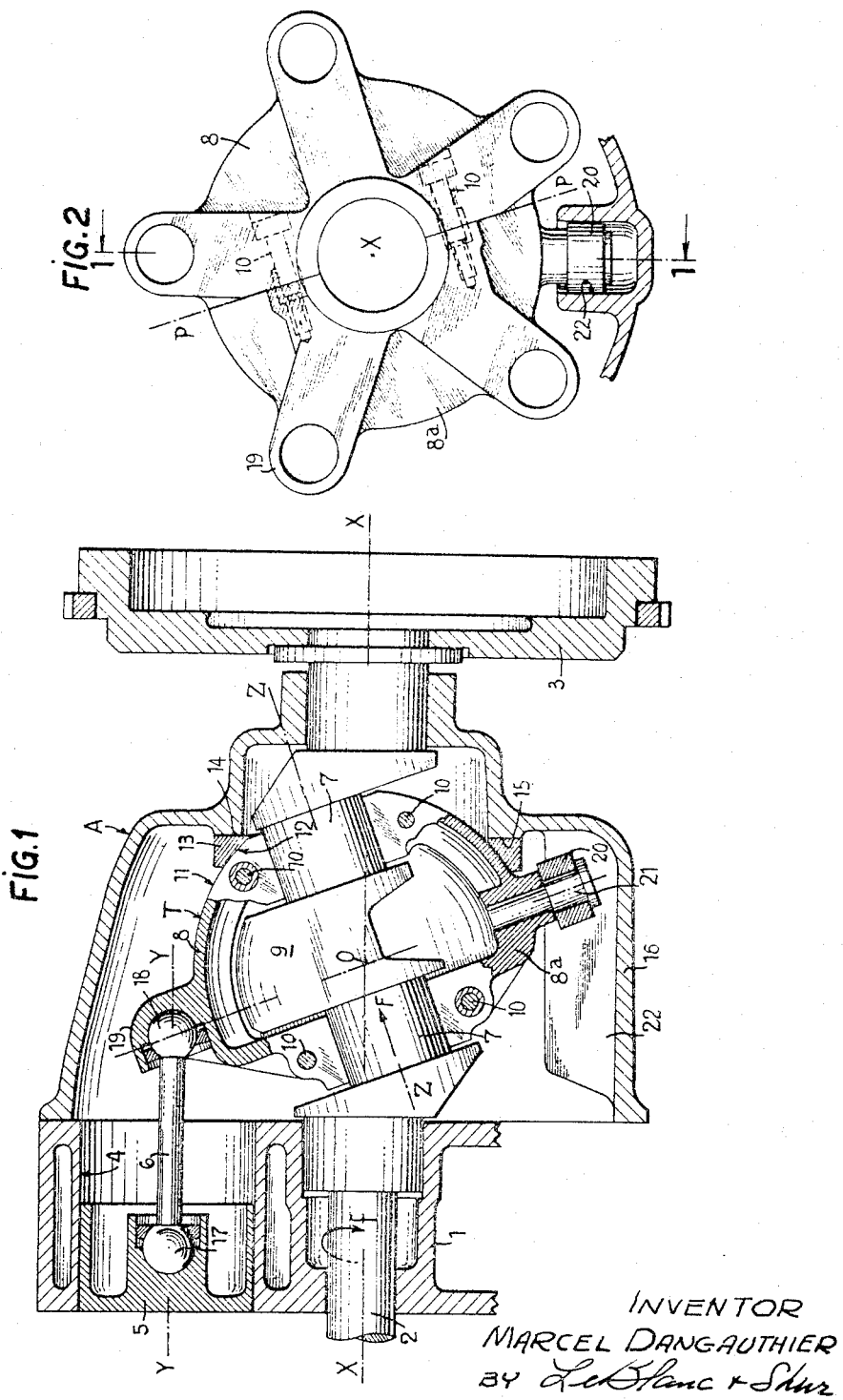

The present invention relates to machines, such as motors, pumps and compressors, of the barrel type in which the cylinders have their axes parallel or substantially parallel and located at the same distance from the axis of the crankshaft, a wabbler mechanism which is prevented from rotating but to which is imparted a movement of precession, being interposed between the crankshaft and the connecting rods connected to the pistons movable in cylinders so as to convert the thrust exerted on said pistons into torque applied to the crankshaft or conversely.

The object of the invention is to provide a simpler solution which is easy to construct, small in size and cheap, and in which the forces of inertia, and in particular those created by the movements of the movement converting wabbler element are balanced under optimum conditions.

The invention provides an improved movement converting mechanism comprising a wabbler element to which is imparted a movement of precession for a machine having pistons which are arranged in the form of a barrel and are substantially parallel with the crankshaft, wherein a counterweight secured to the crankshaft and located within the wabbler element balances at least a part of the forces of inertia created by the movements of said wabbler element. In this way a balancing of the mechanism is obtained without increasing its overall size.

According to another feature of the invention, the wabbler element is composed of two half-shells which surround the counterweight and are interconnected in a joint plane. This arrangement considerably facilitates the assembly and moreover permits utilizing a crankshaft which is in one piece and is not intended to be dismantled.

Preferably, the wabbler element which has a male spherical outer face having a centre located on the point of intersection of the axis of the crankshaft and the axis of the crankpins of said crankshaft on which said wabbler element is journalled, bears on the fixed casing of the mechanism through the medium of a ring having a concave spherical face corresponding to that of the wabbler element, and a plane bearing face adapted to bear against the casing, said plane face being machined flat and perpendicular to the axis of the crankshaft.

Said ring can therefore move relative to the casing in radial directions perpendicular to said axis and there is obtained in particular an automatic and optimum distribution of the forces between the male and female spherical faces.

In a variant of the invention the female spherical face can be merely machined in the casing of the mechanism without interposition of the floating ring.

Another object of the invention is to provide a machine, such as a motor, pump or compressor of the barrel type, provided with the aforementioned wabbler mechanism.

Further features and advantages of the invention will be apparent from the ensuing description with reference to the accompanying drawings to which the invention is in no way limited.

In the drawings:

FIG. 1 is a longitudinal sectional view taken along line 1—1 of FIG. 2 of a mechanism according to the invention, and FIG. 2 is an end elevational view of the wabbler element, this view being taken in the direction of arrow F.

In the illustrated embodiment, the wabbler mechanism A is applied to a machine of the barrel type constituting a motor, pump or compressor. The crankshaft 2 having an axis X—X and carrying at its end a flywheel gear 3, is journalled in a casing 1.

Disposed in concentric relation to the crankshaft are cylinders 4 whose axes Y—Y are roughly parallel with and at the same distance from the axis X—X. Movable in each cylinder is a piston 5 connected to the shaft 2 by a connecting rod 6 and a swashplate or wabbler element T which has a movement of precession and is adapted to convert the alternating movement of the pistons 5 into a rotational movement of the shaft 2 (when the machine is a motor) or conversely (when the machine is a pump or compressor).

The wabbler element T is mounted on two journals constituting a crankpin 7 formed on the shaft 2 and having an axis Z—Z which is oblique relative to the axis X—X, these axes intersecting at O. This wabbler element is composed of two half-shells 8 and 8a which are interconnected in a joint plane P—P that intersects the axes X—X and Z—Z.

These two half-shells surrounded a balancing counterweight 9 secured to the shaft 2 between the two crankpins 7 and they are interconnected by screws 10 located as near as possible to the crankpins so as to prevent these half shells from becoming out of flush and/or gaping open— which would result in imperfect distribution of the forces between the wabbler element and the crankpins and between the wabbler element and the thrust ring.

The half-shells have roughly the shape of two semi-hemispheres and constitute after their assembly a substantially spherical dome which bears through the medium of its spherical outer male face 11 against a female spherical face 12 formed on a thrust ring 13. The latter bears through the medium of a plane machined face 14 against a corresponding plane machined face 15 which is formed in the fixed casing 16 of the mechanism A and is contained in a plane perpendicular to the axis X—X of the crankshaft 2.

Each connecting rod 6 terminates in two ball ends 17 and 18. The ball end 17 bears against the corresponding piston 5 and the ball end 18 bears against a peripheral boss 19 formed on the wabbler element T. Consequently, when the latter is viewed in end elevation it has a star-shape (FIG. 2) which lightens this wabbler element.

The wabbler element T has the crankshaft 2 journalled therein by the crankpins 7 and is prevented from rotating relative to the casing 16 while it is free to effect its movement of precession by a longitudinal guide means, for example comprising, in the known manner, a roller 20 which is freely rotative on a pin 21 carried by the wabbler element T and rolls in a longitudinally extending groove 22 formed in the casing 16.

If the machine operates as a motor, the thrust of the combustion gases exerted in each cylinder 4 on the corresponding piston 5 is communicated through the medium of the connecting rod 6 to the wabbler element T which transmits this force to the crankpins 7 of the crankshaft 2 relative to which the wabbler element T undergoes a movement of precession. The shaft 2 undergoes a uniform movement of rotation in a given direction, for example that shown by arrow $f$ (FIG. 1), and the wabbler element T rotates about the axis Z—Z of the crankpins and relative to the crankshaft 2, taken as a reference point, at a rotational speed which is in the neighbourhood of the preceding speed but is in the opposite direction.

Under these conditions, forces of inertia are created both by this relative movement of the wabbler element and by that of the rods and piston. The counterweight 9 disposed in the wabbler element balances at least a large part of these forces. In this way, the available space is utilized in a rational manner and this permits reducing the overall size of the machine.

Moreover, under the thrust exerted by the connecting rod 6, the wabbler element T bears against the casing 6 through the medium of the thrust ring 13 which, owing to the adjoining machined plane faces 14, 15, can move freely in a direction perpendicular to the direction X—X and thus insure an optimum distribution of force between the male sphere and female sphere and, moreover, can be very slightly deformed for the purpose of fitting the shape of the wabbler element T as closely as possible.

Although specific embodiments of the invention have been described, many modifications and changes may be made therein without departing from the scope of the invention as defined in the appended claims.

Having now described my invention what I claim as new and desire to secure by Letters Patent is:

1. A wabbler mechanism for a machine having pistons, the mechanism comprising a casing, a crankshaft rotatable in the casing and having an inclined crankpin, a hollow wabbler element rotatably mounted on the crankpin and having an inner cavity, actuating connections between the wabbler element and the pistons, a counterweight secured to the crankshaft and located in said cavity, the wabbler element having a male part-spherical face having a centre of sphericity coinciding with the point of intersection of the axis of the crankshaft and the axis of the crankpin, and means defining a female part-spherical bearing face which is the counterpart of the male part-spherical face, and is in sliding contact therewith, the female bearing face being axially stationary relative to the casing and located on the opposite side of the wabbler element to said pistons.

2. A wabbler mechanism as claimed in claim 1, wherein the hollow wabbler element is defined by a wall consisting of a dome-shaped portion and a substantially plane portion extending transversely of the crankpin, the crankpin being rotatably mounted in the dome portion and transversely-extending portion, the dome-shaped wall portion having an outer face constituting said male part-spherical face, the counterweight being rotatable in said cavity.

3. A wabbler mechanism as claimed in claim 1, wherein the means defining the female bearing face is a thrust ring having said part-spherical face and a second plane face, perpendicular to the axis of rotation of the crankshaft, the casing having a plane face against which said second face slidably abuts, whereby the ring is self-centering on the wabbler element.

4. A wabbler mechanism as claimed in claim 2, wherein the wabbler element consists of two assembled non-apertured half-shell single-piece members having a diametral joint plane, each member having two semi-cylindrical recesses engaged around the crankpin, and means rigidly interconnecting the half-shell single piece members.

5. A wabbler mechanism as claimed in claim 1, wherein said cavity has an inner surface parallel to the surface of revolution generated by the counterweight in operation of the mechanism, a slight radial clearance being provided between said inner surface and the counterweight.

References Cited by the Examiner

UNITED STATES PATENTS

| | | | |
|---|---|---|---|
| 1,418,953 | 6/1922 | Martin | 74—60 X |
| 1,885,323 | 11/1932 | Duryea | 74—603 X |
| 1,948,827 | 2/1934 | Redrup | 74—60 |
| 1,968,470 | 7/1934 | Szombathy | 74—60 X |

FRED C. MATTERN, JR., *Primary Examiner.*

BROUGHTON G. DURHAM, *Examiner.*

F. E. BAKER, *Assistant Examiner.*